Aug. 26, 1958 J. R. A. BEALE 2,849,664
SEMI-CONDUCTOR DIODE
Filed Oct. 17, 1955
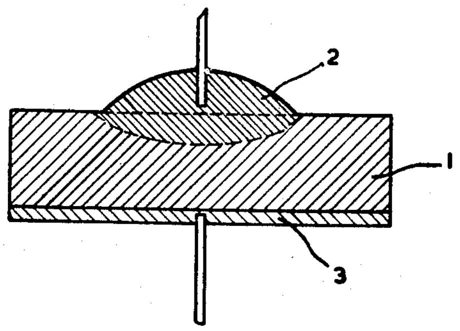
INVENTOR
Julian Robert Anthony Beale
BY [signature]
AGENT United States Patent Office 2,849,664

Patented Aug. 26, 1958

2,849,664

SEMI-CONDUCTOR DIODE

Julian Robert Anthony Beale, Wraysbury, near Staines, England, assignor, by mesne assignments, to North American Philips Company, Inc., New York, N. Y., a corporation of Delaware Application October 17, 1955, Serial No. 540,726

Claims priority, application Great Britain October 18, 1954

8 Claims. (Cl. 317—234)

The invention relates to semi-conductor diodes, which term is to be understood to mean a semi-conductive single crystal consisting for example of germanium or silicon and provided with an ohmic contact and a rectifying electrode. The latter is preferably alloyed to the crystal. The invention also relates to methods of manufacturing such diodes.

Hitherto, in manufacturing such diodes, and transistors also, endeavours have been made to make the life time of the minority carriers as high as possible, for example by using initial materials of maximum purity for the semi-conductive crystal, for example germanium and silicon, and of the donors or acceptors to be added thereto and by excluding certain impurities, such as copper, which were known to form recombination centres.

The invention is based on recognition of the fact that a high lifetime of the minority carriers is indeed desirable in transistors but that a limited lifetime in some cases has advantages in diodes.

Efforts have been made to reduce the storage capacity of such diodes, which limits the maximum operating frequency, by making the thickness of the semi-conductive single crystal small. However, this involves difficulties of construction: narrow tolerances have to be maintained. If, now, the thickness of the crystal is increased so as to exceed the diffusion length of the minority carriers, the capacitance is determined by the lifetime of said carriers, the thickness of the crystal being no longer of importance except in regard to the ohmic resistance of the crystal. The term "thickness of the crystal" as used herein is to be understood to mean the shortest distance between the ohmic contact and the rectifying junction adjacent the rectifying electrode.

It is an object of the invention to reduce the difficulties of construction in the manufacture of a diode which is to be operated at high frequencies.

According to the invention, the semi-conductive single crystal is of a thickness greater than the diffusion length of the minority carriers, the lifetime of said carriers being less than 5 $\mu$ sec., preferably even less than 1 $\mu$ sec. A lifetime of 0.07 $\mu$ sec. can readily be obtained.

The reduction of the lifetime of the minority carriers can be obtained by the addition of impurities, for example copper, nickel and/or iron, to the semi-conductive crystal. When copper is used its acceptor properties may also be utilized.

As an alternative or in addition, the lifetime may be reduced by a suitable surface treatment of the crystal, for example sand-blasting or etching by means of a special etching means containing ions, for example copper ions, which increase the rate of recombination. Such treatments will generally have to be carried out as the final treatment of the semi-conductor body which has already been provided with electrodes.

As a further alternative, the lifetime may be reduced with the aid of bombardment by elementary particles, for example electrons or neutrons.

As a still further alternative, the lifetime of the minority carriers may be reduced by a special heat treatment, for example heating the crystal to a high temperature and then cooling it quickly.

The crystal may be of p-type or of n-type, although in general the crystals of n-type are to be preferred.

The above-mentioned impurities, such as for example copper, nickel and iron, may be introduced into the crystals as such, for example, by coating the crystal with a thin layer of said elements and then heating it to a high temperature, for example, between 500° C. and 900° C., in a neutral atmosphere, so that diffusion occurs. However, the impurities may alternatively be added to the material from which the crystal is manufactured, for example, by drawing, zone melting or zone levelling.

One embodiment of a diode according to the present invention and one embodiment of a method according to the present invention will now be described with reference to the accompanying diagrammatic drawing which is a sectional view of a diode.

In the figure, the semi-conductive crystal is designated 1, the rectifying electrode 2 and the ohmic contact 3. The ohmic contact may consist of nickel. The rectifying electrode shown is a mass of indium secured by alloying; however, use may also be made of a point contact.

The diode shown may, for example, be manufactured by coating a bar of n-type germanium having a resistivity between 0.4 and 2 ohm-cm. which contains a small amount of antimony as a donor with nickel electrolytically. The thickness of the nickel layer which, for example, may range from 1 $\mu$ to 100 $\mu$ is not critical. The crystal is subsequently heated to a temperature between 700° C. and 800° C. for 2 hours to 5 hours in an inert gas, for example in nitrogen. The crystal is then cooled to room temperature in a period of time between 10 and 60 minutes. The lifetime of the minority carriers is about 1 $\mu$ sec. when heating is effected at 700° C. and about 0.1 $\mu$ when heating is effected at 800° C. The diffusion length correspondingly is about 65 $\mu$ and 20 $\mu$, respectively. The bar is subsequently cut into slices or wafers about ¾ mm. thick, that is to say materially thicker than the diffusion length, which are used, in the manner described hereinbefore, in a diode by applying thereto the ohmic and rectifying connections.

What is claimed is:

1. A semi-conductor diode comprising a semi-conductive body and ohmic and rectifying connections to said body and spaced apart a distance greater than the diffusion length of minority carriers in said body, the lifetime of minority carriers in said body being not more than 5 microseconds.

2. A semi-conductor diode as claimed in claim 1 wherein the lifetime of the minority carriers is less than one microsecond.

3. A semi-conductor diode comprising a semi-conductive body and ohmic and rectifying connections to said body and spaced apart a distance greater than the diffusion length of minority carriers in said body, the lifetime of minority carriers in said body being not more than 5 microseconds, said body containing an impurity which promotes recombination of minority carriers, thus to produce the short lifetime.

4. A diode as set forth in claim 3, wherein the impurity is an element selected from the group consisting of copper, nickel and iron.

5. A semi-conductor diode comprising a semi-conductive body and ohmic and rectifying connections to said body and spaced apart a distance greater than the diffusion length of minority carriers in said body, the lifetime of minority carriers in said body being not more than 5 microseconds, said body being produced by subjecting it to a treatment which increases the rate of surface recombination.

6. A diode as set forth in claim 5, wherein the body is etched in a bath containing ions of a metal which promotes recombination.

7. A semi-conductor diode comprising a semi-conductive body and ohmic and rectifying connections to said body and spaced apart a distance greater than the diffusion length of minority carriers in said body, the lifetime of minority carriers in said body being not more than 5 microseconds; said body being produced by subjecting it to a treatment that promotes defects in the crystal lattice of the body.

8. A semi-conductor diode comprising a semi-conductive body and ohmic and rectifying connections to said body and spaced apart a distance greater than the diffusion length of minority carriers in said body, the lifetime of minority carriers in said body being not more than 5 microseconds, said body being produced by subjecting it to bombardment by elementary particles.

References Cited in the file of this patent

UNITED STATES PATENTS

| | | |
|---|---|---|
| 2,646,536 | Benzer et al. | July 21, 1953 |
| 2,744,970 | Shockley | May 8, 1956 |